US008621017B2

(12) United States Patent
Kirkpatrick

(10) Patent No.: US 8,621,017 B2
(45) Date of Patent: *Dec. 31, 2013

(54) SYSTEM AND METHOD FOR EMAIL NOTIFICATION

(75) Inventor: Mark Kirkpatrick, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 153 days.

This patent is subject to a terminal disclaimer.

(21) Appl. No.: 13/208,853

(22) Filed: Aug. 12, 2011

(65) Prior Publication Data

US 2011/0299669 A1 Dec. 8, 2011

Related U.S. Application Data

(63) Continuation of application No. 12/423,840, filed on Apr. 15, 2009, now Pat. No. 8,090,785, which is a continuation of application No. 09/604,965, filed on Jun. 28, 2000, now Pat. No. 7,590,539.

(51) Int. Cl.
*G06F 15/16* (2006.01)

(52) U.S. Cl.
USPC .......................................... 709/206; 709/203

(58) Field of Classification Search
USPC ................................................ 709/203–206
See application file for complete search history.

(56) References Cited

U.S. PATENT DOCUMENTS

| 5,163,130 | A | 11/1992 | Hullot |
| 5,475,738 | A | 12/1995 | Penzias |
| 5,479,411 | A | 12/1995 | Klein |
| 5,862,325 | A | 1/1999 | Reed et al. |
| 5,944,786 | A | 8/1999 | Quinn |
| 5,995,597 | A | 11/1999 | Woltz et al. |
| 6,009,469 | A | 12/1999 | Mattaway et al. |
| 6,035,273 | A | 3/2000 | Spies |
| 6,052,442 | A | 4/2000 | Cooper et al. |
| 6,064,990 | A | 5/2000 | Goldsmith |
| 6,108,688 | A | 8/2000 | Nielsen |
| 6,131,121 | A | 10/2000 | Mattaway et al. |
| 6,175,859 | B1 | 1/2001 | Mohler |
| 6,212,265 | B1 * | 4/2001 | Duphorne ............. 379/142.15 |
| 6,226,678 | B1 | 5/2001 | Mattaway et al. |
| 6,243,681 | B1 | 6/2001 | Guji et al. |
| 6,249,808 | B1 | 6/2001 | Seshadri |
| 6,263,064 | B1 | 7/2001 | O'Neal et al. |
| 6,282,183 | B1 | 8/2001 | Harris et al. |

(Continued)

OTHER PUBLICATIONS

Kirkpatrick; Advisory Action mailed Feb. 13, 2004 for U.S. Appl. No. 09/604,965, filed Jun. 28, 2000.

(Continued)

*Primary Examiner* — Minh-Chau Nguyen
(74) *Attorney, Agent, or Firm* — Wolff & Samson, PC

(57) ABSTRACT

Email subscribers are notified of the receipt of new email messages when they are not at their computers via voice or page. An email notification server polls the email server corresponding to the subscriber's email account for the presence of new email messages. New email messages are obtained. Header information is extracted. If new email notification is by voicemail, the extracted header information is converted from text to voice. A voicemail message containing the extracted header information is saved on the voicemail system corresponding to the subscriber for whom the email message was intended. The email notification server can also send a page to notify the subscriber of the presence of new email.

20 Claims, 5 Drawing Sheets

(56) References Cited

U.S. PATENT DOCUMENTS

| | | |
|---|---|---|
| 6,335,963 B1 | 1/2002 | Bosco |
| 6,345,288 B1 | 2/2002 | Reed et al. |
| 6,349,336 B1 | 2/2002 | Sit et al. |
| 6,351,523 B1 | 2/2002 | Detlef |
| 6,400,810 B1 | 6/2002 | Skladman et al. |
| 6,421,781 B1 | 7/2002 | Fox et al. |
| 6,453,337 B2 | 9/2002 | Miller et al. |
| 6,457,045 B1 | 9/2002 | Hanson et al. |
| 6,463,145 B1 | 10/2002 | O'Neal et al. |
| 6,507,643 B1 | 1/2003 | Groner |
| 6,560,456 B1 | 5/2003 | Lohtia et al. |
| 6,633,630 B1 * | 10/2003 | Owens et al. ............ 379/93.24 |
| 6,633,848 B1 | 10/2003 | Johnson et al. |
| 6,640,301 B1 | 10/2003 | Ng |
| 6,647,260 B2 | 11/2003 | Dusse et al. |
| 6,711,154 B1 | 3/2004 | O'Neal |
| 6,721,784 B1 | 4/2004 | Leonard et al. |
| 6,728,731 B2 | 4/2004 | Sarukkai et al. |
| 6,732,151 B1 | 5/2004 | Tobias et al. |
| 6,738,820 B2 | 5/2004 | Hilt |
| 6,742,127 B2 | 5/2004 | Fox et al. |
| 6,754,181 B1 | 6/2004 | Elliott et al. |
| 6,766,299 B1 | 7/2004 | Bellomo et al. |
| 6,775,690 B1 | 8/2004 | Creswell et al. |
| 6,895,558 B1 | 5/2005 | Loveland |
| 6,965,918 B1 | 11/2005 | Arnold et al. |
| 6,981,062 B2 | 12/2005 | Suryanarayana |
| 6,987,840 B1 | 1/2006 | Bosik et al. |
| 7,047,532 B1 | 5/2006 | Connelly |
| 7,085,812 B1 | 8/2006 | Sherwood |
| 7,113,501 B2 | 9/2006 | Garakani et al. |
| 7,120,671 B2 | 10/2006 | Gusler et al. |
| 7,136,475 B1 | 11/2006 | Rogers et al. |
| 7,196,807 B2 | 3/2007 | Goldstone |
| 7,240,095 B1 | 7/2007 | Lewis |
| 7,305,441 B2 | 12/2007 | Mathewson, II et al. |
| 7,505,759 B1 | 3/2009 | Rahman |
| 7,590,539 B1 | 9/2009 | Kirkpatrick |
| 7,609,820 B2 | 10/2009 | Bedingfield, Sr. |
| 8,090,785 B2 | 1/2012 | Kirkpatrick |
| 2002/0032741 A1 | 3/2002 | Hilt |
| 2002/0035607 A1 | 3/2002 | Checkoway et al. |
| 2002/0061003 A1 | 5/2002 | Sumner et al. |
| 2002/0064137 A1 | 5/2002 | Garakani et al. |
| 2002/0155848 A1 | 10/2002 | Suryanarayana |
| 2003/0055902 A1 | 3/2003 | Amir et al. |
| 2003/0072451 A1 | 4/2003 | Pimentel et al. |
| 2003/0142364 A1 | 7/2003 | Goldstone |
| 2003/0177171 A1 | 9/2003 | Brown et al. |
| 2004/0068665 A1 | 4/2004 | Fox et al. |
| 2004/0086094 A1 | 5/2004 | Bosik et al. |
| 2004/0087300 A1 | 5/2004 | Lewis |
| 2005/0100143 A1 | 5/2005 | Bedingfield |
| 2006/0056603 A1 | 3/2006 | Harrity |
| 2008/0205602 A1 | 8/2008 | Bishop |
| 2008/0205610 A1 | 8/2008 | Bishop |

OTHER PUBLICATIONS

Kirkpatrick; Examiner Interview Summary mailed Jan. 23, 2008 for U.S. Appl. No. 09/604,965, filed Jun. 28, 2000.
Kirkpatrick; Examiner Interview Summary mailed Sep. 27, 2004 for U.S. Appl. No. 09/604,965, filed Jun. 28, 2000.
Kirkpatrick; Final Rejection mailed Jan. 23, 2007 for U.S. Appl. No. 09/604,965, filed Jun. 28, 2000.
Kirkpatrick; Final Rejection mailed Aug. 4, 2004 for U.S. Appl. No. 09/604,965, filed Jun. 28, 2000.
Kirkpatrick; Final Rejection mailed Nov. 24, 2003 for U.S. Appl. No. 09/604,965, filed Jun. 28, 2000.
Kirkpatrick; Non-Final Rejection mailed Mar. 11, 2004 for U.S. Appl. No. 09/604,965, filed Jun. 28, 2000.
Kirkpatrick; Non-Final Rejection mailed May 30, 2008 for U.S. Appl. No. 09/604,965, filed Jun. 28, 2000.
Kirkpatrick; Non-Final Rejection mailed Jun. 4, 2003 for U.S. Appl. No. 09/604,965, filed Jun. 28, 2000.
Kirkpatrick; Non-Final Rejection mailed Jul. 25, 2006 for U.S. Appl. No. 09/604,965, filed Jun. 28, 2000.
Kirkpatrick; Non-Final Rejection mailed Nov. 27, 2007 for U.S. Appl. No. 09/604,965, filed Jun. 28, 2000.
Kirkpatrick; Non-Final Rejection mailed Dec. 19, 2002 for U.S. Appl. No. 09/604,965, filed Jun. 28, 2000.
Kirkpatrick; Notice of Allowance mailed Jan. 8, 2009 for U.S. Appl. No. 09/604,965, filed Jun. 28, 2000.
Kirkpatrick; Supplemental Notice of Allowance mailed Aug. 20, 2009 for U.S. Appl. No. 09/604,965, filed Jun. 28, 2000.
Kirkpatrick; U.S. Appl. No. 09/604,965, filed Jun. 28, 2000.
Kirkpatrick; Non-Final Office Action mailed Dec. 9, 2010 for U.S. Appl. No. 12/423,840, filed Apr. 15, 2009.
Kirkpatrick; Notice of Allowance mailed May 13, 2011 for U.S. Appl. No. 12/423,840, filed Apr. 15, 2009.
Lewis; Final Rejection mailed Sep. 28, 2006 for U.S. Appl. No. 10/080,484, filed Feb. 22, 2002.
Lewis; Final Rejection mailed Oct. 5, 2005 for U.S. Appl. No. 10/080,484, filed Feb. 22, 2002.
Lewis; Non-Final Rejection mailed Apr. 7, 2005 for U.S. Appl. No. 10/080,484, filed Feb. 22, 2002.
Lewis; Non-Final Rejection mailed Apr. 10, 2006 for U.S. Appl. No. 10/080,484, filed Feb. 22, 2002.
Lewis; Notice of Allowance and Fees Due mailed Mar. 6, 2007 for U.S. Appl. No. 10/080,484, filed Feb. 22, 2002.
Lewis; U.S. Appl. No. 10/080,484, filed Feb. 22, 2002.
Bedingfield; Final Rejection mailed Oct. 20, 2008 for U.S. Appl. No. 10/706,361, filed Nov. 12, 2003.
Bedingfield; Non-Final Rejection mailed Jan. 11, 2008 for U.S. Appl. No. 10/706,361, filed Nov. 12, 2003.
Bedingfield; Notice of Allowance mailed Feb. 24, 2009 for U.S. Appl. No. 10/706,361, filed Nov. 12, 2003.
Bedingfield; U.S. Appl. No. 10/706,361, filed Nov. 12, 2003.
Bishop; Final Office Action mailed Jun. 8, 2011 for U.S. Appl. No. 11/678,368, filed Feb. 23, 2007.
Bishop; Non-Final Office Action mailed Dec. 22, 2010 for U.S. Appl. No. 11/678,368, filed Feb. 23, 2007.
Bishop; U.S. Appl. No. 11/678,368, filed Feb. 23, 2007.
Bishop; Final Office Action mailed Jun. 8, 2011 for U.S. Appl. No. 11/678,423, filed Feb. 23, 2007.
Bishop; Non-Final Office Action mailed Dec. 22, 2010 for U.S. Appl. No. 11/678,423, filed Feb. 23, 2007.
Bishop; U.S. Appl. No. 11/678,423, filed Feb. 23, 2007.
Bishop; Non-Final Office Action mailed Dec. 27, 2011 for U.S. Appl. No. 11/678,368, filed Feb. 23, 2007.
Bishop; Non-Final Office Action mailed Jan. 3, 2012 for U.S. Appl. No. 11/678,423, filed Feb. 23, 2007.

* cited by examiner

SYSTEM AND METHOD FOR EMAIL NOTIFICATION

CROSS-REFERENCE TO RELATED APPLICATIONS

This application is a continuation of co-pending U.S. Utility Patent Application entitled, "System and Method for Email Notification", having Ser. No. 12/423,840, filed Apr. 15, 2009, which is a continuation of U.S. Utility Patent Application entitled, "System and Method for Email Notification", having Ser. No. 09/604,965, filed Jun. 28, 2000, which are both entirely incorporated herein by reference.

BACKGROUND

1. Field of Invention

The present invention relates generally to the field of telecommunications. More specifically, the present invention relates to email notification systems.

2. Background of the Invention

Today, people communicate with one another in numerous ways. Telephones, I-pagers, cell phones and email are just a few examples of these communication technologies. Often however, the person to whom a communication is attempted is not available to answer a call, page or email immediately. Consequently, those initiating the communication desire to leave a message. For whatever reason, most people tend to check their voicemail more often than other message technologies, for example, email. Although conventional voicemail systems can be tied into pagers to alert subscribers that they have a pending voicemail, this is not the case for email users. Email users are not notified of the incoming email if they are not sitting at their computer. Indeed, people leaving an email will often call the email recipient to notify them that an email has been sent and to look for it. This is undesirable considering the large number of emails being sent today.

Some conventional email systems allow the email messages to be automatically forwarded to a pager. However, not all email systems offer this capability, and not all pagers are able to take advantage of it. Consequently, not all pager users can have their email messages sent to their pagers.

SUMMARY

One embodiment of the present disclosure is an automatic subscription service that uses a client to poll a subscriber's email account. When the subscriber receives a new email, the embodiment obtains the email from the subscriber's email account, extracts the headers from the email messages and convert the header from text to speech using any of a variety of well-known text to voice conversions. The converted headers are stored in a voicemail account corresponding to the person's email account. The person's voicemail account can be set up to notify the person of the new voicemail corresponding to the new email. In this manner, the person is notified of the delivery of an email without having to be at a computer and without significant changes to the existing notification infrastructure. Moreover, this removes the requirement of following an email with a call notifying the intended recipient of the email.

In alternative embodiments, the person is notified by a page of new voicemail messages. If the pager has a text capability, the text of the email header is presented to the subscriber.

In one embodiment, the notifications can be from more than one email account. Thus, the subscriber may have, for example, an office email account and a home email account. The notification system of one embodiment can poll each account for the presence of new email, and notify the subscriber accordingly. In one embodiment, a code or other indicator is used to differentiate the source of the email or its priority.

Preferably, no changes are made to existing email servers. The system of one embodiment preferably accesses the email information for each of its subscribers in a conventional fashion to determine if there are any new email messages for a particular subscriber.

Thus, one object is to provide notification of the receipt of an email message to the email message's recipient or recipients.

Another object is to provide notification of the receipt of an email message without requiring the recipient to be at a computer.

Yet another object is to provide notification of an email message without significantly modifying existing notification structures.

Yet another object is to provide notification of email messages using pagers.

Yet another object is to provide notification of receipt of email messages though voicemail.

Yet another object is to provide notification of the receipt of an email message from any number of email accounts a subscriber may desire.

Yet another object is to provide notification of the receipt of an email message without significant change to conventional email notification systems.

These and other objects are described in greater detail in the detailed description, the appended drawings and the attached claims.

DETAILED DESCRIPTION OF THE PREFERRED EMBODIMENTS

Figure 1:
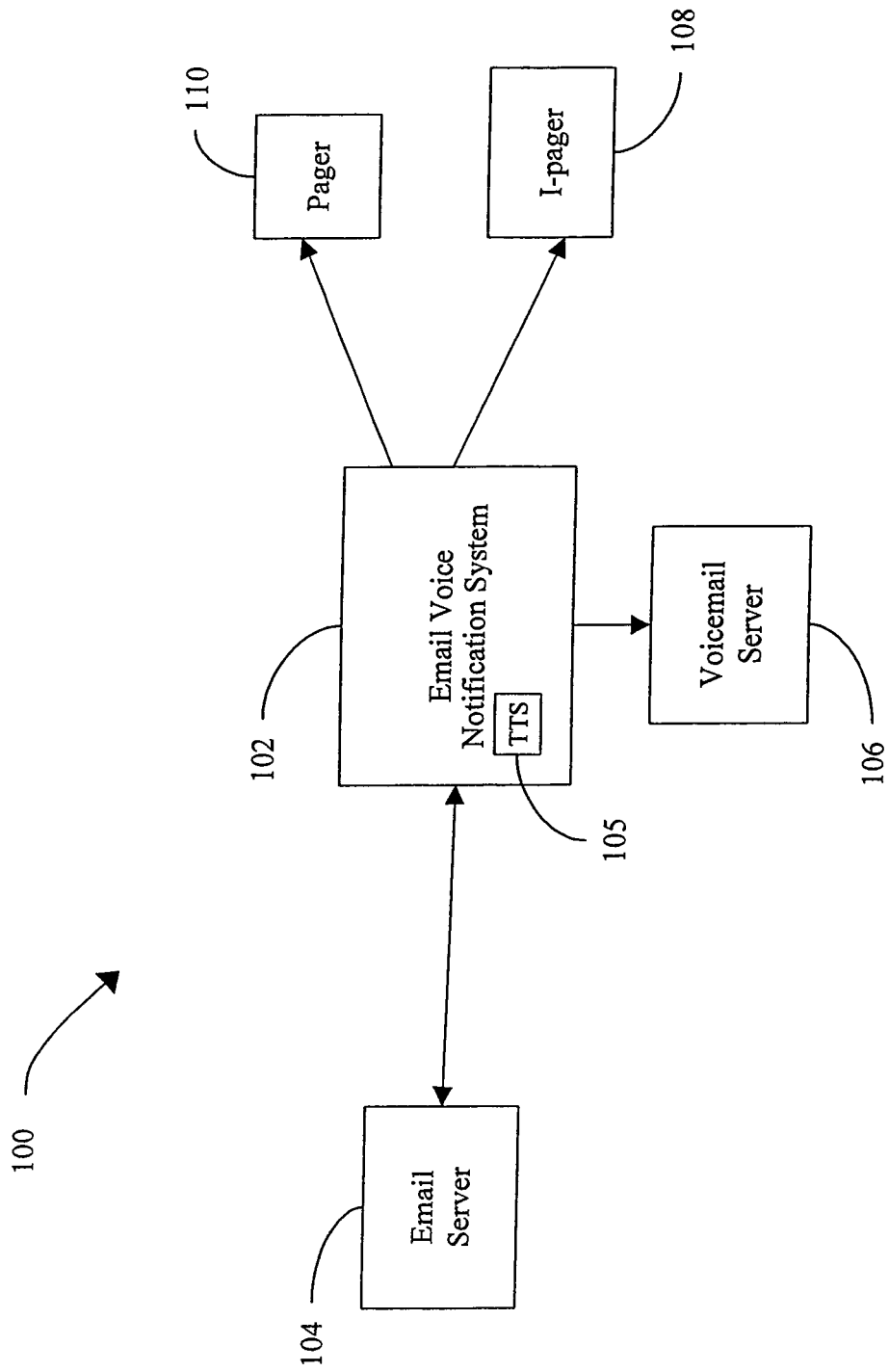
FIG. 1 is a schematic illustration of a system for providing notification of mail messages according to a preferred embodiment of the present invention.
Figure 2:
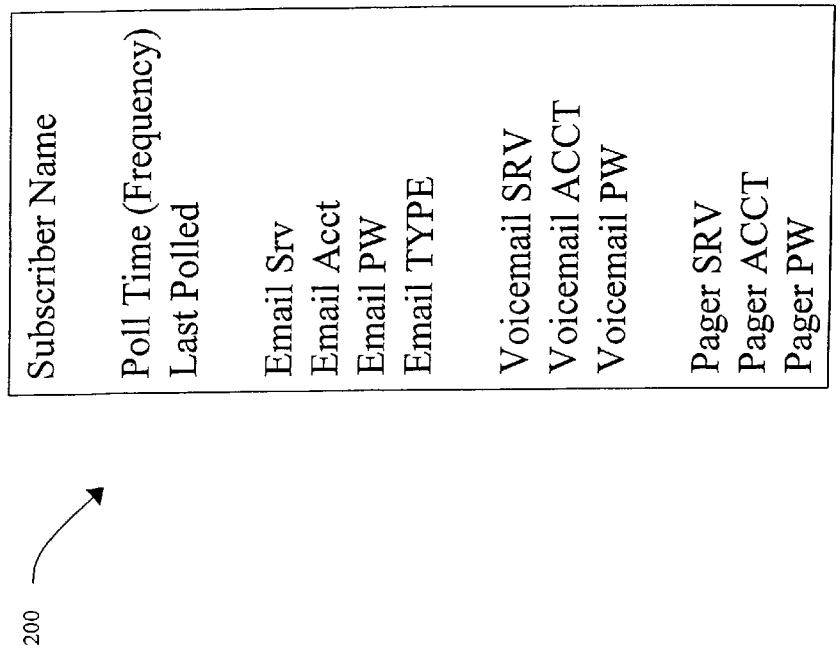
FIG. 2 illustrates a preferred structure for an account record of required subscriber contact information according to a preferred embodiment of the present invention.

A preferred embodiment of a system 100 for notifying a subscriber of the receipt of an email message is illustrated schematically in FIG. 1. An email voice notification system (EMVN) 102 obtains the data required for the email notification according to the preferred embodiment of the present invention. In a preferred embodiment of the present invention, EMVN 102 also carries out the email notification. For each subscriber, EMVN 102 logs into an email server 104 that holds the subscriber's email account. An exemplary email server 104 is an SMTP email server. SMTP email servers are well known to those skilled in the art. Preferably, EMVN 102 interacts with an email server in a conventional manner. For example, where email server 104 is an SMTP server, EMVN 102 preferably communicates with email server 102 as a conventional SMTP client, for example, OUTLOOK or any other standard SMTP client. EMVN 102 would then obtain any new email messages. EMVN 102 executes a text-to-voice converter to convert the header information in the email to voice. If desired, only a portion of the header information need be converted to speech. Such text-to-voice converters are well known, for example, Lucent TTS, available from Lucent Technologies in Murray Hill, N.J.

After converting the email header information from text to voice, EMVN 102 preferably calls up voice mail system 106 to access the voice mailbox of the subscriber. Preferably, EMVN 102 has access to a database 107 containing an account record (described below) for the subscriber, including for example, subscriber voice mail information. Accessing the subscriber's voicemail can require authorization such as providing a PIN code. In the preferred embodiment of the present invention, the PIN code is obtained by accessing the subscriber information in the subscriber's account record stored in database 107.

When EMVN 102 successfully accesses the subscriber's voicemail system 106, it leaves a voice mail message containing the email header information that was converted from text to speech. In a preferred embodiment of the present invention, the information left in the voice mail notification message extracted from the header information includes: the time the message was sent, the identity of the sender and the subject of the message if there is one. In addition, the priority of the message can be given, for example high, normal or low. In addition, the subscriber can be notified if there are any attachments to the email.

Preferably voicemail system 106 is configured to send a message to the subscriber's pager, digital phone, or some other device for notifying the subscriber. Preferably, the voicemail notification is independent of the EMVN 102. That is, EMVN 102 generates a new voicemail message containing information regarding any new email. The subscriber's existing voicemail notification system notifies the subscriber of the voicemail message in a conventional fashion. For example, if voicemail system 106 is connected to a pager, it sends a page to the subscriber to notify the subscriber of the new message. In an alternative preferred embodiment of the present invention, voicemail system 106 is integrated with EMVN 102.

In an alternative embodiment of the present invention, EMVN 102 performs the notification to the subscriber itself. In the alternative preferred embodiment, EMVN 102 sends a message to a pager identified in the subscriber's account record (described below), for example, I-pager 108 or pager 110. In either case, if the pager is text capable, the email header information, or a portion thereof, is displayed as text on the pager display. In this case, the email header does not have to be first converted to speech. If the pager is not text capable, a code, for example, the number 777, can be displayed on the pager to indicate that new email has been received. The information to contact pager 108 or page 110 is stored in an account record (described below) for the subscriber.

EMVN 102 can be set up to poll email server 102 according to any desired criteria. For example, polling can be periodic, for example once per hour. Alternatively, polling can be random, for example 6 times a day, but not at set times. It would be apparent to those skilled in the art that other polling paradigms can be used that fall within the scope and spirit of the present invention. In addition, the same polling can be applied for each subscriber, or different polling can be performed for different subscribers. For example, higher paying subscribers might be assigned a higher polling frequency. In the latter instance, polling frequency is a field stored in the subscriber's account record stored in database 107. In a preferred embodiment, the notification is sent to more than one notification device at the same time. For example, EMVN 102 can post a voicemail message containing the header information, and at the same time send a notification message to a pager associated with the subscriber.

An exemplary subscriber account record stored in database 107 is illustrated in Table I. Preferably, the account record contains the following fields:

| FIELD | DESCRIPTION |
|---|---|
| SUSCRIBER NAME | Name of the subscriber. |
| POLL TIME | Frequency with which the subscriber's email account is polled. |
| LAST POLLED | Time the subscriber's email account was last polled. This value can be used in conjunction with the POLL TIME field and the current time to determine if the subscriber's email account should be polled again. |
| EMAIL SRV | Address of the subscriber's email account. |
| EMAIL ACCT | Subscriber's email account name. |
| EMAIL PW | Subscriber's email authorization information, for example password or PIN. |
| EMAIL TYPE | Type of email account, for example, SMTP or X.400. EMVN 102 consults the EMAIL TYPE field to determine the appropriate protocol to use when communicating with email server 104. |
| VOICEMAIL SRV | Address of the subscriber's voicemail server. If the subscriber uses just an answering machine, this field contains the telephone number of the answering machine. |
| VOICEMAIL ACCT | Account number of the subscriber's voicemail account, for example extension number. |
| VOICEMAIL PW | Any required password information that is required to leave a message on the subscriber's voicemail. |
| PAGER SRV | Address of the server that sends a message to the subscriber's pager, or the telephone number of the subscriber's pager. Alternatively, the PAGER SRV field contains the phone number of the subscriber's pager. |
| PAGER ACCT | Account number or identification code of the pager, if required, to send a message to the subscriber's pager. |
| PAGE PW | Any password required to send a message to the subscriber's pager. |

Table I: Fields in Subscriber Account Record

If the subscriber desires that multiple email accounts be monitored, then the POLL TIME, LAST POLLED, EMAIL SRV, EMAIL ACCT, EMAL PW and EMAIL TYPE fields are all repeated as necessary to represent each of the subscriber's email accounts to be polled. The POLL TIME and LAST POLLED fields can be different for each of the subscriber's email accounts. Thus, subscribers can choose to have their different email accounts polled according to different criteria. For example, subscribers might want to poll their office email accounts more often than their personal email accounts.

EMVN 102 is preferably a UNIX system, though any system capable of performing the email server client and notification functions described herein can be used. The present invention is protocol-independent. That is, the email server 104 can be any email server. EMVN 102 would have to be programmed to perform the functions described herein for the kind of email server being used, as defined in the EMAIL TYPE field. Programming EMVN 102 to communicate with an email server to provide the functions described herein would be apparent to those skilled in this art.

In a preferred embodiment of the present invention, EMVN 102 is offered as a subscription service. That is, subscribers pay an additional fee periodically (preferably a month) for the email notification service.

Figure 3A:
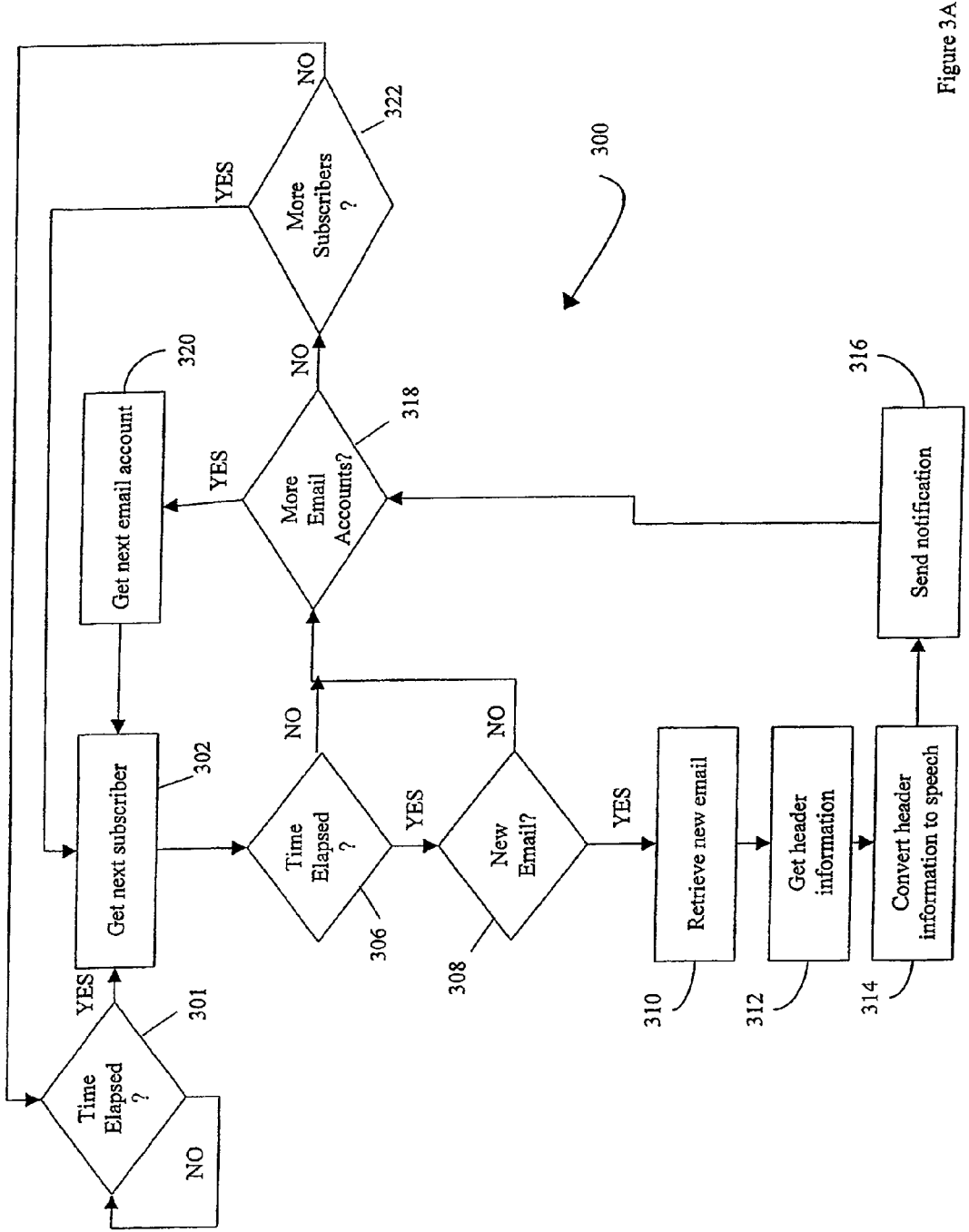
FIG. 3A is a flow chart for a process for email notification according to a first preferred embodiment of the present invention.
Figure 3B:
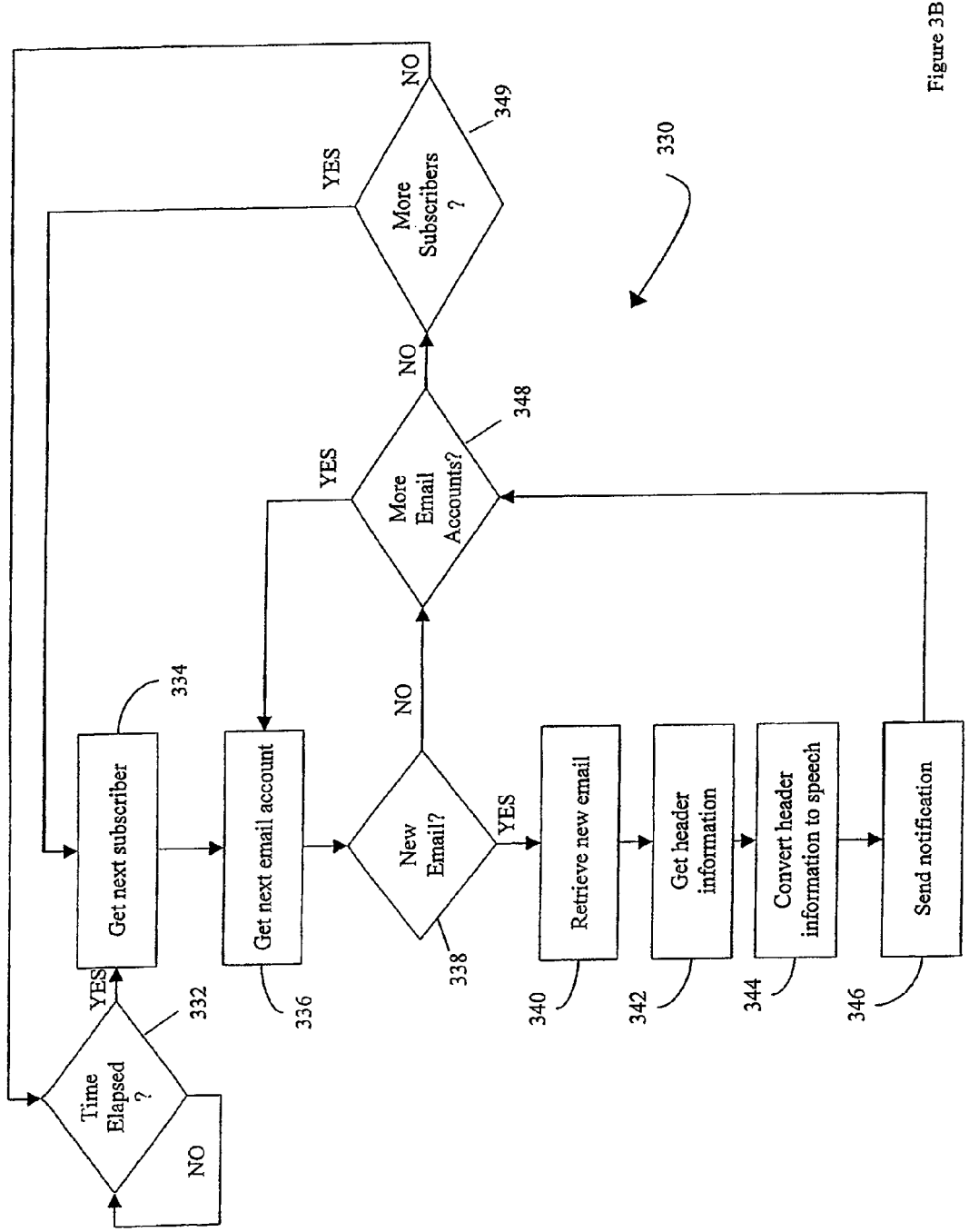
FIG. 3B is a flow chart for a process for email notification according to a second preferred embodiment of the present invention.
Figure 3C:
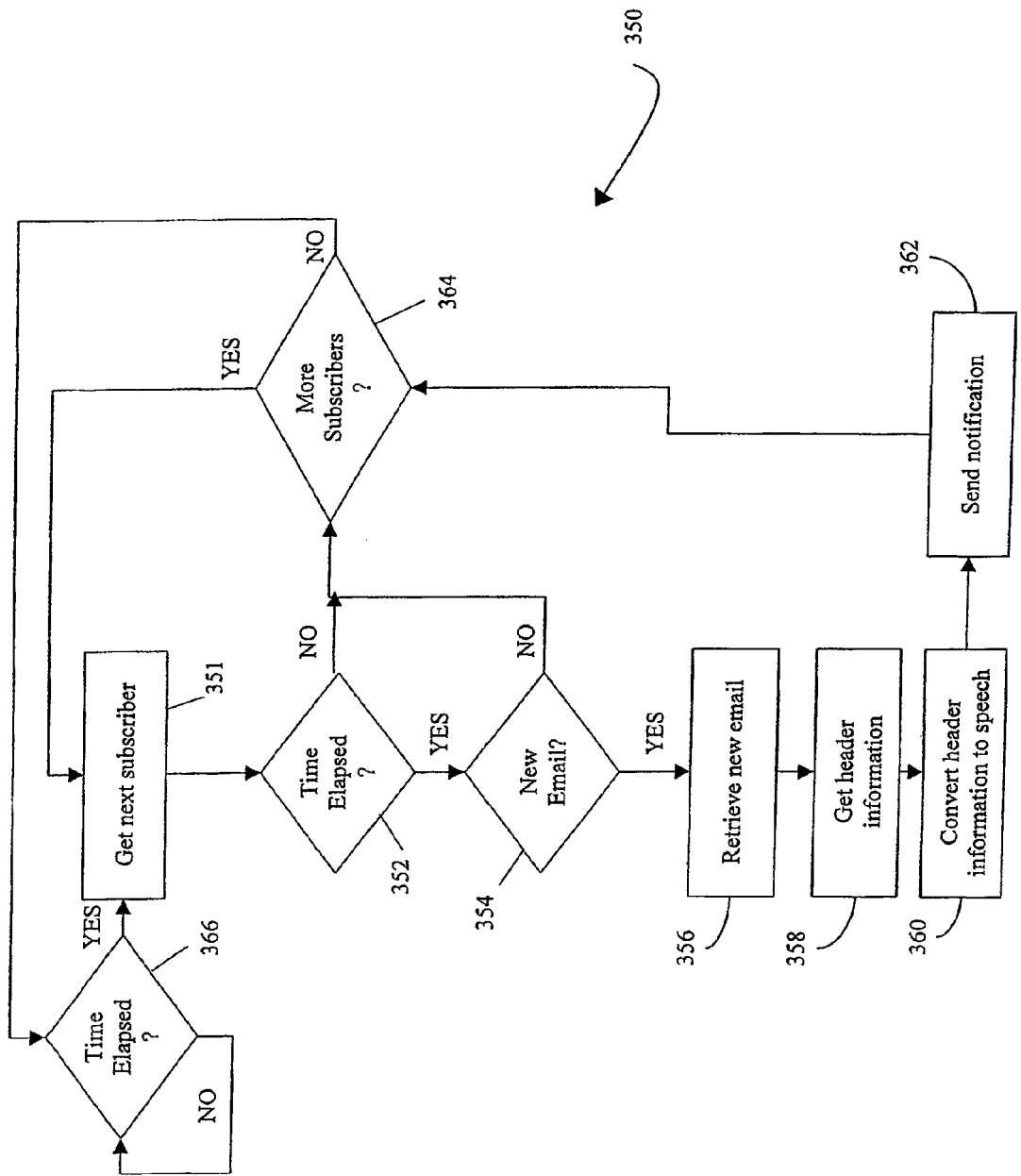
FIG. 3C is a flow chart for a process for email notification according to a 15 third preferred embodiment of the present invention.

FIGS. 3A-3C are flow charts of exemplary processes 300, 330 and 350 respectively according to alternative preferred embodiments of the present invention. Processes 300, 330 and 350 preferably execute on EVMN 102. Referring to FIG. 3A a process 300 according to a first preferred embodiment of the present invention is described. Process 300 preferably executes on EMVN 102. In step 301, process 300 determines whether a predetermined time has elapsed for polling email server 104 for new emails. If the predetermined time has not elapsed, then process 300 stays in step 301. If the predetermined time has elapsed, then process 300 gets the next subscriber record to be polled in step 302. If this is the first iteration, then process 300 gets the first subscriber record to be polled in step 302. In step 306, process 300 determines whether a second predetermined time has elapsed for the current subscriber record to be polled. This second predetermined time is used for subscribers that may have multiple email accounts to be polled (for example, work and personal email accounts). As described above, the subscriber may have different email accounts with different polling requirements for each account. If the second predetermined time has elapsed in step 306, process 300 continues in step 308 where process 300 determines if there is any new email in the subscriber's email account. If there is new email, process 300 retrieves all new email in step 310. Process 300 extracts header information from each of the new email messages in step 312. Process 300 converts the text header information to speech in step 314. Process 300 sends the speech information to a voice mailbox associated with the subscriber in step 316. The subscriber is notified of the new voicemail, for example, in one of the ways described above.

If in step 308 there is no more email, process 300 continues in step 318. Process 300 continues in step 318 if the second predetermined time has not elapsed as determined in step 306. In step 318, process 300 determines if the subscriber has more email accounts. If the subscriber has more email accounts, then process 300 obtains the next email account in step 320 and continues processing in step 306 as described above. If the subscriber has no more email accounts, process 300 continues in step 322 where it determines if there are more subscribers for whom email account polling is required. If there are more subscribers, process 300 gets the next subscriber record in step 302 and processing continues as described above for the new subscriber record. If there are no more subscribers, process 300 continues in step 301 where it waits for the first predetermined time to elapse before repeating the entire process. If should be noted that the first predetermined time can be arbitrary. In an alternative preferred embodiment, process 300 is started by an operator initiating the process by, for example, clicking on a START button on a computer display.

Referring to FIG. 3B, a process 330 according to a second preferred embodiment of the present invention is described. Process 330 preferably executes on EMVN 102. In step 332, process 330 determines whether a predetermined time has elapsed for polling email server 104 for new emails. If the predetermined time has not elapsed, then process 330 stays in step 331. If the predetermined time has elapsed, then process 330 gets the next subscriber record to be polled in step 334. If this is the first iteration, then process 330 gets the first subscriber record to be polled in step 334.

Process 330 gets the next (or first) email account in step 336 in the subscriber record. As described above, subscribers can have multiple accounts. In step 338, process 330 determines if there is any new email in the subscriber's email account. If there is new email, process 330 retrieves all new email in step 340. Process 330 extracts header information from each of the new email messages in step 342. Process 330 converts the text header information to speech in step 344. Process 330 sends the speech information to a voice mailbox associated with the subscriber in step 346. The subscriber is notified of the new voicemail, for example, in one of the ways described above.

If in step 338 there is no more email, process 330 continues in step 348. In step 348, process 330 determines if the subscriber has more email accounts. If the subscriber has more email accounts, then process 330 obtains the next email account in step 336 and continues processing in step 338 as described above. If the subscriber has no more email accounts, process 330 continues in step 349 where it determines if there are more subscribers for whom email account polling is required. If there are more subscribers, process 330 gets the next subscriber record in step 334 and processing continues as described above for the new subscriber record. If there are no more subscribers, process 330 continues in step 332 where it wait for the first predetermined time to elapse before repeating the entire process. If should be noted that the first predetermined time can be arbitrary. In an alternative preferred embodiment, process 330 is started by an operator initiating the process by, for example, clicking on a START button on a computer display.

Referring to FIG. 3C, a process 350 according to a third preferred embodiment of the present invention is described. Process 350 preferably executes on EMVN 102. In step 366, process 350 determines whether a predetermined time has elapsed for polling email server 104 for new emails. If the predetermined time has not elapsed, then process 350 stays in step 366. If the predetermined time has elapsed, then process 350 gets the next subscriber record to be polled in step 351. If this is the first iteration, then process 350 gets the next (or first) subscriber record to be polled in step 351.

Process 350 determines whether the time has elapsed for this subscriber's account to be polled in step 352. If that time has elapsed, process 350 determines if there is any new email in the subscriber's email account in step 354. If there is new email, process 350 retrieves all new email in step 356. Process 350 extracts header information from each of the new email messages in step 358. Process 350 converts the text header information to speech in step 360. Process 350 sends the speech information to a voice mailbox associated with the subscriber in step 362. The subscriber is notified of the new voicemail, for example, in one of the ways described above.

If in step 354 there is no more email, process 350 continues in step 364 where it determines if there are more subscribers for whom email account polling is required. If there are more subscribers, process 350 gets the next subscriber record in step 351 and processing continues as described above for the new subscriber record. If there are no more subscribers, process 350 continues in step 366 where it wait for the first predetermined time to elapse before repeating the entire process. If should be noted that the first predetermined time can be arbitrary. In an alternative preferred embodiment, process 350 is started by an operator initiating the process by, for example, clicking on a START button on a computer display.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for notifying a subscriber of a presence of new email messages, comprising:
    polling a plurality of email accounts associated with a subscriber, each of the plurality of email accounts polled at a respective frequency designated by the subscriber;
    detecting a newly received email message of the subscriber at an email server associated with one of the plurality of email accounts;
    extracting a portion of a header of the newly received email message responsive to a determination that the newly received email message is present at the email server;
    converting the portion of the header extracted to a speech message; and
    calling, by a notification server, a voicemail server to access a voicemail box of the subscriber and transferring the speech message to the voicemail box at the voicemail server, wherein the speech message indicates that the newly received email message is present at the email server.

2. The method of claim 1, wherein information contained in the speech message extracted from the header includes a time the newly received email message was sent by a sender.

3. The method of claim 1, wherein information contained in the speech message extracted from the header includes an identity of a sender.

4. The method of claim 1, wherein information contained in the speech message extracted from the header includes a subject of the newly received email message.

5. The method of claim 1, wherein information contained in the speech message extracted from the header includes a priority assigned to the newly received email message.

6. The method of claim 1, wherein information contained in the speech message extracted from the header includes an indication that an attachment is included with the newly received email message.

7. The method of claim 1, wherein the speech message is generated to indicate a presence of the newly received email message on any of the plurality of email accounts of the subscriber.

8. The method of claim 1, wherein a first speech message is generated to indicate a presence of a first newly received email message on a first email account of the subscriber and a second speech message is generated to indicate a presence of a second newly received email message on a second email account of the subscriber.

9. The method of claim 8, wherein the first newly received email message is maintained on the email server and the second newly received email message is maintained on a second email server that is different from the email server.

10. The method of claim 1, further comprising sending a text message to a digital phone of the subscriber indicating a presence of the newly received email message at the email server.

11. A notification system comprising:
    a processor; and
    a memory to store computer program instructions, the computer program instructions when executed on the processor cause the processor to perform operations comprising:
    polling a plurality of email accounts associated with a subscriber, each of the plurality of email accounts polled at a respective frequency designated by the subscriber;
    detecting a newly received email message of the subscriber at an email server associated with one of the plurality of email accounts;
    extracting a portion of a header of the newly received email message responsive to a determination that the newly received email message is present at the email server;
    converting the extracted portion of the header to a speech message; and
    calling a voicemail server to access a voicemail box of the subscriber and transfer the speech message to the voicemail box at the voicemail server, wherein the speech message indicates that the newly received email message is present at the email server.

12. The notification system of claim 11, wherein information contained in the speech message extracted from the header includes a time the newly received email message was sent by a sender.

13. The notification system of claim 11, wherein information contained in the speech message extracted from the header includes an identity of a sender.

14. The notification system of claim 11, wherein information contained in the speech message extracted from the header includes a subject of the newly received email message.

15. The notification system of claim 11, wherein information contained in the speech message extracted from the header includes a priority assigned to the newly received email message.

16. The notification system of claim 11, wherein information contained in the speech message extracted from the header includes an indication that an attachment is included with the newly received email message.

17. The notification system of claim 11, wherein a first speech message is generated to indicate a presence of a first newly received email message on a first email account of the subscriber and a second speech message is generated to indicate a presence of a second newly received email message on a second email account of the subscriber.

18. The notification system of claim 17, wherein the first newly received email message is maintained on the email server and the second newly received email message is maintained on a second email server that is different from the email server.

19. The notification system of claim 11, wherein the instructions executable by the processor further cause the processor to send a text message to a digital phone of the subscriber indicating a presence of the newly received email message at the email server.

20. A method for notifying a subscriber of a presence of new email messages, comprising:
   polling a plurality of email accounts associated with a subscriber, each of the plurality of email accounts polled at a respective frequency designated by the subscriber;
   detecting a newly received email message of the subscriber at an email server associated with one of the plurality of email accounts;
   extracting a portion of a header of the newly received email message responsive to a determination that the newly received email message is present at the email server;
   converting the extracted portion of the header to a speech message;
   calling, by a notification server, a voicemail server to access a voicemail box of the subscriber and transferring the speech message to the voicemail box at the voicemail server, wherein the speech message indicates that the newly received email message is present at the email server; and
   sending, by the notification server, a text message to the subscriber indicating presence of the newly received email message at the email server.

* * * * *